United States Patent
Ukai et al.

(10) Patent No.: US 10,480,087 B2
(45) Date of Patent: Nov. 19, 2019

(54) MEMBRANE ELECTRODE ASSEMBLY AND ELECTROCHEMICAL HYDROGEN PUMP

(71) Applicant: Panasonic Intellectual Property Management Co., Ltd., Osaka (JP)

(72) Inventors: Kunihiro Ukai, Nara (JP); Yuuichi Yakumaru, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 133 days.

(21) Appl. No.: 15/709,560

(22) Filed: Sep. 20, 2017

(65) Prior Publication Data

US 2018/0179647 A1 Jun. 28, 2018

(30) Foreign Application Priority Data

Dec. 26, 2016 (JP) .................................. 2016-251503

(51) Int. Cl.
*C25B 9/10* (2006.01)
*H01M 2/14* (2006.01)

(52) U.S. Cl.
CPC ................ *C25B 9/10* (2013.01); *H01M 2/14* (2013.01)

(58) Field of Classification Search
CPC ....... H01M 8/0232; H01M 2008/1095; H01M 8/0245; H01M 8/1004; H01M 4/80; H01M 4/8605; C25B 11/035
See application file for complete search history.

(56) References Cited

U.S. PATENT DOCUMENTS

| 5,272,017 | A | * | 12/1993 | Swathirajan | .............. C25B 9/10 429/309 |
| 2002/0081478 | A1 | * | 6/2002 | Busenbender | .......... C23C 30/00 429/518 |
| 2003/0003345 | A1 | * | 1/2003 | Ohara | ................. H01M 4/9083 429/437 |

(Continued)

FOREIGN PATENT DOCUMENTS

| JP | 2000-058073 A | 2/2000 |
| JP | 2001-342587 | 12/2001 |
| JP | 2006-070322 | 3/2006 |

OTHER PUBLICATIONS

The Extended European Search Report dated May 30, 2018 for the related European Patent Application No. 17206930.4.

*Primary Examiner* — Imran Akram

(74) *Attorney, Agent, or Firm* — Greenblum & Bernstein, P.L.C.

(57) ABSTRACT

A membrane electrode assembly includes: an electrolyte membrane that includes a pair of main surfaces; a cathode catalyst layer that is provided to one main surface of the electrolyte membrane; an anode catalyst layer that is provided to the other main surface of the electrolyte membrane; a cathode gas diffusion layer that is provided to the cathode catalyst layer; and an anode gas diffusion layer that is provided to the anode catalyst layer. The anode gas diffusion layer includes a metal steel plate that includes a plurality of vent holes through which gas passes, unevenness is provided to a main surface of the metal steel plate that neighbors the anode catalyst layer, and a difference in a height of the unevenness in a thickness direction of the metal steel plate is less than a thickness of the electrolyte membrane.

20 Claims, 9 Drawing Sheets

(56) References Cited

U.S. PATENT DOCUMENTS

| | | | |
|---|---|---|---|
| 2003/0228512 A1* | 12/2003 | Vyas | C23C 14/022 429/492 |
| 2004/0062974 A1* | 4/2004 | Abd Elhamid | B29C 70/58 429/468 |
| 2004/0211679 A1 | 10/2004 | Wong et al. | |
| 2008/0138687 A1* | 6/2008 | Abd Elhamid | H01M 8/0206 429/518 |
| 2008/0248358 A1* | 10/2008 | Miyazaki | H01M 8/04156 429/494 |
| 2010/0291464 A1* | 11/2010 | Abd Elhamid | H01M 8/0208 429/483 |
| 2011/0217621 A1* | 9/2011 | Felix | H01M 4/8605 429/492 |
| 2011/0287336 A1* | 11/2011 | Himeno | H01M 8/0213 429/492 |

\* cited by examiner

MEMBRANE ELECTRODE ASSEMBLY AND ELECTROCHEMICAL HYDROGEN PUMP

BACKGROUND

1. Technical Field

The present disclosure relates to a membrane electrode assembly and an electrochemical hydrogen pump.

2. Description of the Related Art

In recent years, hydrogen has been attracting attention as a clean alternative energy resource that replaces fossil fuels in view of environmental problems such as global warming and energy problems such as exhaustion of oil resources. Basically only water is emitted in a case where hydrogen is combusted. Carbon dioxide, which can be a cause of global warming, is not discharged, and nitrogen oxides or the like is hardly discharged. Thus, hydrogen is expected as a clean energy source. An example of an apparatus that highly efficiently uses hydrogen as a fuel is a fuel cell. Development and popularization of the fuel cell have been progressing for vehicle power sources and household power generation.

In a hydrogen-based society in the future, it is desired to develop techniques in which, in addition to production of hydrogen, hydrogen may be stored at high density and transported or used by a small capacity and low cost. Particularly, a fuel supply infrastructure needs to be built for promoting the use of the fuel cell as a distributed energy source. Accordingly, in order to stably supply hydrogen to the fuel supply infrastructure, various suggestions for refinement and pressurization of high purity hydrogen have been made.

For example, a high-pressure hydrogen production apparatus has been suggested in which a voltage is applied between an anode and a cathode provided to an electrolyte membrane, water supplied to the anode side is thereby electrolyzed so that hydrogen in a high pressure state is produced on the cathode side (for example, see Japanese Unexamined Patent Application Publication No. 2001-342587).

Further, a pressing section is disclosed which may press a cathode feeder to an electrolyte membrane and cause the cathode feeder to tightly contact with the electrolyte membrane by using a disc spring, a coil spring, or the like so that contact resistance between the electrolyte membrane and the cathode feeder does not easily increase even in a case where hydrogen (cathode gas) is at a high pressure (for example, see Japanese Unexamined Patent Application Publication No. 2006-70322).

SUMMARY

However, in related art, suppressing an increase in contact resistance between an electrolyte membrane and an anode feeder has not sufficiently been discussed.

One non-limiting and exemplary embodiment provides a membrane electrode assembly that may suppress an increase in contact resistance between an electrolyte membrane (anode catalyst layer) and an anode gas diffusion layer compared to related art. Further, one non-limiting and exemplary embodiment provides an electrochemical hydrogen pump that includes such a membrane electrode assembly.

In one general aspect, the techniques disclosed here feature a membrane electrode assembly including: an electrolyte membrane that includes a pair of main surfaces; a cathode catalyst layer that is provided to one main surface of the electrolyte membrane; an anode catalyst layer that is provided to the other main surface of the electrolyte membrane; a cathode gas diffusion layer that is provided to the cathode catalyst layer; and an anode gas diffusion layer that is provided to the anode catalyst layer, in which the anode gas diffusion layer includes a metal steel plate that includes a plurality of vent holes through which gas passes, unevenness is provided to a main surface of the metal steel plate that neighbors the anode catalyst layer, and a difference in a height of the unevenness in a thickness direction of the metal steel plate is less than a thickness of the electrolyte membrane.

The membrane electrode assembly and the electrochemical hydrogen pump provide an effect of suppressing the increase in the contact resistance between the electrolyte membrane (the anode catalyst layer) and the anode gas diffusion layer compared to related art.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
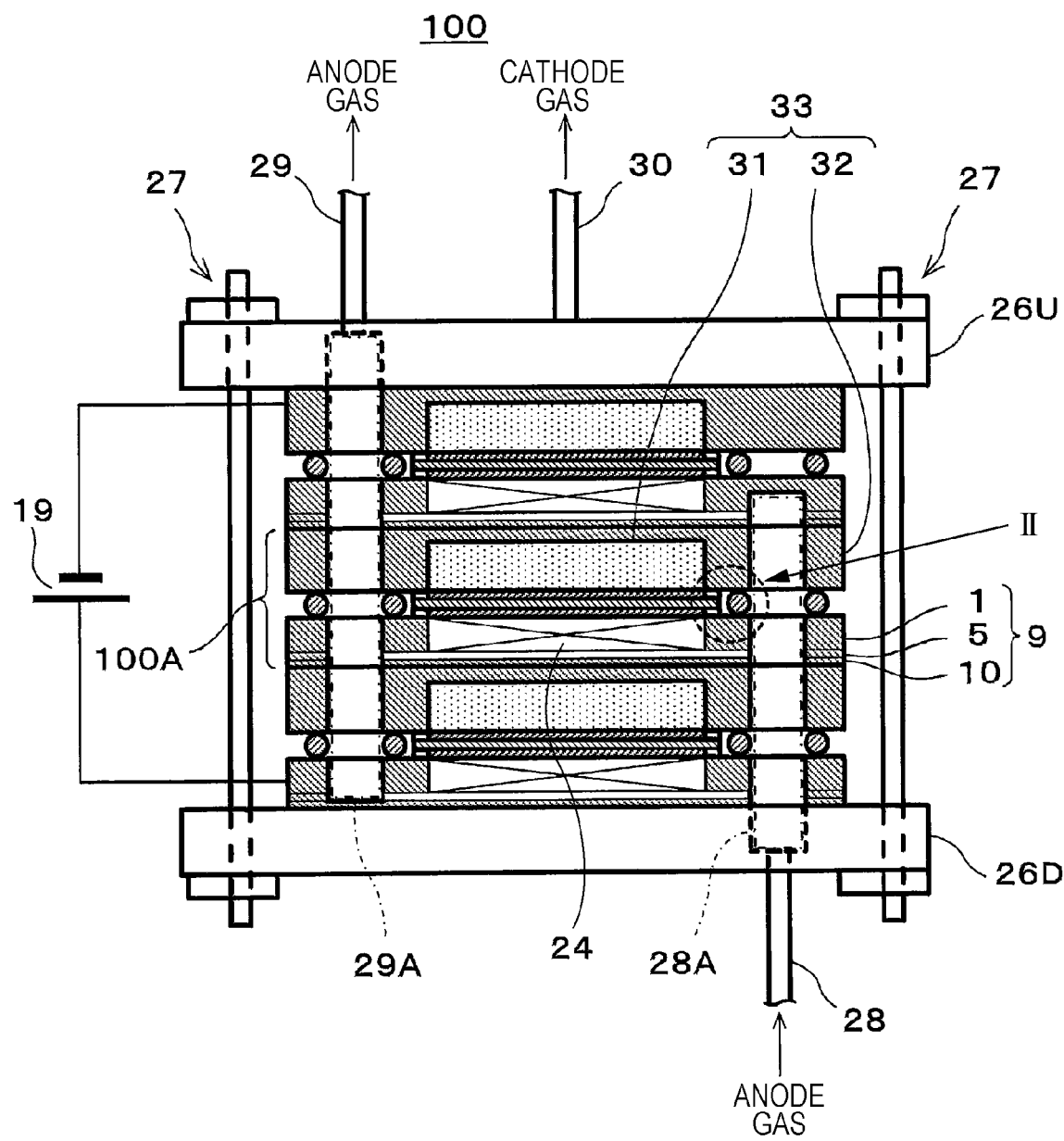
FIG. 1 is a diagram that illustrates one example of a membrane electrode assembly and an electrochemical hydrogen pump of an embodiment.

As described above, Japanese Unexamined Patent Application Publication No. 2006-70322 discusses a configuration that suppresses an increase in contact resistance between an electrolyte membrane and a cathode feeder. However, a configuration that suppresses an increase in contact resistance between the electrolyte membrane and an anode feeder is not sufficiently discussed.

Accordingly, as a result of intensive studies, the inventors have reached a conception of providing unevenness on a main surface of a flat metal steel plate that neighbors an anode catalyst layer and originally has little unevenness in order to suppress the increase in the contact resistance between the electrolyte membrane (the anode catalyst layer) and an anode gas diffusion layer.

That is, a membrane electrode assembly of a first aspect of the present disclosure includes: an electrolyte membrane that includes a pair of main surfaces; a cathode catalyst layer that is provided to one main surface of the electrolyte membrane; an anode catalyst layer that is provided to the other main surface of the electrolyte membrane; a cathode gas diffusion layer that is provided to the cathode catalyst layer; and an anode gas diffusion layer that is provided to the anode catalyst layer, in which the anode gas diffusion layer includes a metal steel plate that includes plural vent holes through which gas passes, unevenness is provided to a main surface of the metal steel plate that neighbors the anode catalyst layer, and a difference in a height of the unevenness in a thickness direction of the metal steel plate is less than a thickness of the electrolyte membrane.

Further, a membrane electrode assembly of a second aspect of the present disclosure includes: an electrolyte membrane that includes a pair of main surfaces; a cathode catalyst layer that is provided to one main surface of the electrolyte membrane; an anode catalyst layer that is provided to the other main surface of the electrolyte membrane; a cathode gas diffusion layer that is provided to the cathode catalyst layer; and an anode gas diffusion layer that is provided to the anode catalyst layer, in which the anode gas diffusion layer includes a metal steel plate that includes plural vent holes through which gas passes, unevenness is provided to a main surface of the metal steel plate that neighbors the anode catalyst layer, and surface roughness Ra of the main surface of the metal steel plate that neighbors the anode catalyst layer is less than a thickness of the electrolyte membrane.

In such a configuration, the membrane electrode assemblies of the first aspect and the second aspect may suppress the increase in the contact resistance between the electrolyte membrane (the anode catalyst layer) and the anode gas diffusion layer compared to related art.

Here, the surface roughness Ra conforms to JIS B0601: 2001.

Specifically, the main surface of the metal steel plate and the main surface of the electrolyte membrane (the anode catalyst layer) neighbor each other in a planar manner along the unevenness on the main surface of the metal steel plate. Then, the unevenness is provided to the main surface of the metal steel plate, and a large contact area between the main surface of the metal steel plate and the main surface of the electrolyte membrane (the anode catalyst layer) may thereby be obtained. Thus, compared to a case where unevenness, which is of a dimension equal to or greater than a predetermined dimension, is not provided to the main surface of the metal steel plate, the increase in the contact resistance between the main surface of the metal steel plate and the main surface of the electrolyte membrane (the anode catalyst layer) is suppressed.

Here, as the difference of the height of unevenness in the thickness direction of the metal steel plate is greater, the possibility of damage to the electrolyte membrane (the anode catalyst layer) due to the unevenness becomes higher in a case where the main surface of the metal steel plate and the main surface of the electrolyte membrane (the anode catalyst layer) neighbor each other in a planar manner along the unevenness. However, in the membrane electrode assembly of the first aspect, because the difference in the height of such unevenness is less than the thickness of the electrolyte membrane, deformation (expansion) of the electrolyte membrane (the anode catalyst layer) due to the unevenness is inhibited, and the above possibility may thereby be reduced. Further, as the surface roughness Ra of the main surface of the metal steel plate is greater, the possibility of damage to the electrolyte membrane (the anode catalyst layer) due to the unevenness becomes higher in a case where the main surface of the metal steel plate and the main surface of the electrolyte membrane (the anode catalyst layer) neighbor each other in a planar manner along the unevenness. However, in the membrane electrode assembly of the second aspect, because such surface roughness Ra is less than the thickness of the electrolyte membrane, deformation (expansion) of the electrolyte membrane (the anode catalyst layer) due to the unevenness is inhibited, and the above possibility may thereby be reduced.

That is, in the membrane electrode assembly of the aspects, while the possibility of damage to the electrolyte membrane (the anode catalyst layer) due to the unevenness of the main surface of the metal steel plate is reduced, the contact area between the main surface of the metal steel plate and the main surface of the electrolyte membrane (the anode catalyst layer) may appropriately be secured.

The electrochemical hydrogen pump of one aspect of the present disclosure includes a voltage applicator that applies a voltage between the cathode catalyst layer and the anode catalyst layer and the membrane electrode assembly of the first aspect or the second aspect.

As described above, the membrane electrode assembly of the first aspect or the second aspect may suppress the increase in the contact resistance between the electrolyte membrane (the anode catalyst layer) and the anode gas diffusion layer compared to related art. Thus, the electrochemical hydrogen pump of this aspect may inhibit the increase in power consumption requested for the electrochemical hydrogen pump in a case where a desired voltage is applied to the membrane electrode assembly.

Specific examples of an embodiment, a modification example of the embodiment, and a first example to a fourth example of the embodiment will hereinafter be described with reference to attached drawings. Each of the specific examples described in the following represents one example of each of the above aspects. Thus, shapes, materials, configuration elements, arrangement positions and connection manners of configuration elements, and so forth that are described in the following do not limit any of the above aspects unless those are described in claims. Further, the configuration elements that are not described in the independent claims which provide the most superordinate concepts of the aspects among the configuration elements in the following will be described as arbitrary configuration elements. Further, the elements to which the same reference characters are given in the drawings may not be described. Further, the drawings schematically illustrate the configuration elements for easy understanding. Shapes, dimension ratios, and so forth may not accurately be depicted.

Embodiment

[Apparatus Configuration]

Figure 2:
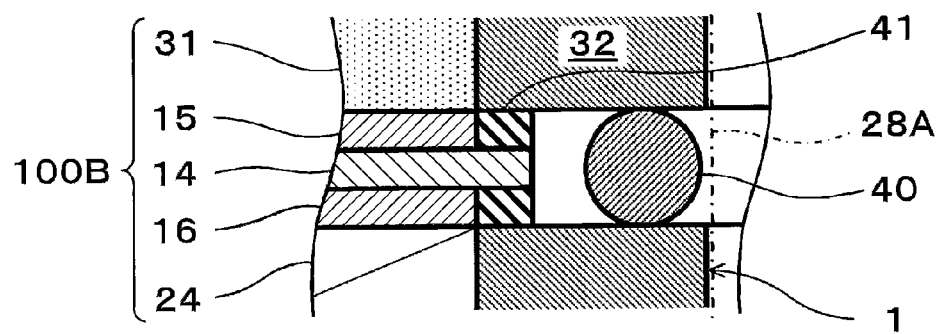
FIG. 2 is a diagram that illustrates one example of the membrane electrode assembly and the electrochemical hydrogen pump of the embodiment.

FIG. 1 and FIG. 2 are diagrams that illustrate examples of a membrane electrode assembly and an electrochemical hydrogen pump of an embodiment. FIG. 2 is an enlarged diagram of part II in FIG. 1.

As illustrated in FIG. 2, a membrane electrode assembly 100B of this embodiment includes an electrolyte membrane 14, a cathode catalyst layer 15, an anode catalyst layer 16, a cathode gas diffusion layer 31, and an anode gas diffusion layer 24.

Further, as illustrated in FIG. 1 and FIG. 2, an electrochemical hydrogen pump 100 of this embodiment includes the membrane electrode assembly 100B and a voltage applicator 19.

Here, an anode gas diffusion device 9 is configured with an anode main body 1 that includes the anode gas diffusion layer 24, an anode gas flow path plate 5, and an anode end plate 10. Here, a cathode gas diffusion device 33 is configured with the cathode gas diffusion layer 31 and a cathode separator 32. In this case, a unit cell 100A of the electrochemical hydrogen pump 100 includes the electrolyte membrane 14, the cathode catalyst layer 15, the anode catalyst layer 16, the cathode gas diffusion device 33, and the anode gas diffusion device 9.

Thus, the electrochemical hydrogen pump 100 of FIG. 1 configures a stack in which three tiers of the unit cells 100A are laminated. However, the number of tiers of the unit cells 100A is not limited to this. That is, the number of tiers of the unit cells 100A may be set to a proper number based on operation conditions such as the hydrogen amount of the electrochemical hydrogen pump 100.

A fastener 27 fastens the membrane electrode assembly 100B. That is, in order to appropriately hold plural unit cells 100A that include the membrane electrode assembly 100B in a laminated state, an end surface of the cathode gas diffusion device 33 of the uppermost layer of the unit cells 100A and an end surface of the anode gas diffusion device 9 of the lowermost layer are interposed between an end plate 26U and an end plate 26D via insulating plates or the like, which are not illustrated, and a desired fastening pressure has to be thereby exerted on the unit cells 100A. Thus, the plural fasteners 27 that include a disc spring or the like for exerting the fastening pressure on the unit cells 100A are provided in appropriate positions of the end plate 26U and the end plate 26D.

The fastener 27 may be in any configuration as long as the fastener 27 may fasten the membrane electrode assembly 100B. Examples of the fastener 27 may include a bolt that passes through the end plate 26U and the end plate 26D, a nut with a disc spring, and so forth, for example.

The end plate 26U is provided with a cathode gas lead-out pipe 30 through which cathode gas from the cathode gas diffusion layer 31 flows. That is, the cathode gas lead-out pipe 30 communicates with a tubular cathode gas lead-out manifold (not illustrated) that is provided to the unit cell 100A in the laminated state. Note that in a planar view, a sealing member such as an O-ring, which is not illustrated, is provided between the cathode gas diffusion device 33 and the anode gas diffusion device 9 so as to surround the cathode gas lead-out manifold, and the cathode gas lead-out manifold is appropriately sealed by the sealing member.

The end plate 26U is also provided with an anode gas lead-out pipe 29 through which excess anode gas from the anode gas diffusion device 9 flows. That is, the anode gas lead-out pipe 29 communicates with a tubular anode gas lead-out manifold 29A that is provided to the unit cell 100A in a laminated state. Note that in a planar view, a sealing member 40 such as an O-ring is provided between the cathode gas diffusion device 33 and the anode gas diffusion device 9 so as to surround the anode gas lead-out manifold 29A, and the anode gas lead-out manifold 29A is appropriately sealed by the sealing member 40.

The end plate 26D is provided with an anode gas introduction pipe 28 through which the anode gas supplied to the anode gas diffusion device 9 flows. That is, the anode gas introduction pipe 28 communicates with a tubular anode gas introduction manifold 28A that is provided to the unit cell 100A in the laminated state. Note that in a planar view, the sealing member 40 such as an O-ring is provided between the cathode gas diffusion device 33 and the anode gas diffusion device 9 so as to surround the anode gas introduction manifold 28A, and the anode gas introduction manifold 28A is appropriately sealed by the sealing member 40.

The electrolyte membrane 14 includes a pair of main surfaces. The electrolyte membrane 14 is a proton-conductive polymer membrane through which protons ($H^+$) are permeable. The electrolyte membrane 14 may be any membrane as long as that is the proton-conductive polymer membrane. For example, as the electrolyte membrane 14, a fluorine-based polymer electrolyte membrane and so forth may be raised. Specifically, for example, Nafion® (DuPont), Aciplex™ (Asahi Kasei Corporation), and so forth may be used.

The cathode catalyst layer 15 is provided on one main surface (for example, the front surface) of the electrolyte membrane 14. Note that in a planar view, a sealing member 41 such as an O-ring and a gasket is provided so as to surround the cathode catalyst layer 15, and the cathode catalyst layer 15 is appropriately sealed by the sealing member 41. That is, the electrochemical hydrogen pump 100 of this embodiment includes a sealing structure that performs sealing against leakage of cathode gas (hydrogen) which flows through the cathode gas diffusion layer 31 on the cathode separator 32 in an outer periphery of a recess portion 35 (see FIG. 3) of the cathode separator 32. Accordingly, the cathode catalyst layer 15 and the cathode gas diffusion layer 31 may appropriately be sealed by using a main surface of the cathode separator 32. The cathode catalyst layer 15 includes platinum as catalyst metal, for example, but embodiments are not limited to this.

The cathode gas diffusion layer 31 of the cathode gas diffusion device 33 is provided to the cathode catalyst layer 15. A specific configuration of the cathode gas diffusion device 33 will be described later.

The anode catalyst layer 16 is provided on the other main surface (for example, the back surface) of the electrolyte membrane 14. Note that in a planar view, a sealing member 42 such as an O-ring and a gasket is provided so as to surround the anode catalyst layer 16, and the anode catalyst layer 16 is appropriately sealed by the sealing member 42. That is, the electrochemical hydrogen pump 100 of this embodiment includes the sealing structure that performs sealing against leakage of the anode gas which flows through the anode gas diffusion layer 24 on the anode main body 1 in an outer periphery of the anode gas diffusion layer 24. Accordingly, the anode catalyst layer 16 and the anode gas diffusion layer 24 may appropriately be sealed by using a main surface of the anode main body 1. The anode catalyst layer 16 includes RuIrFeOx as catalyst metal, for example, but embodiments are not limited to this.

The anode gas diffusion layer 24 of the anode gas diffusion device 9 is provided to the anode catalyst layer 16. A specific configuration of the anode gas diffusion device 9 will be described later.

Because various methods may be raised as catalyst adjustment methods for the cathode catalyst layer 15 and the anode catalyst layer 16, the adjustment methods are not particularly limited. For example, as carriers of the catalysts, electrically-conductive porous substance powder, carbon-based powder, and so forth may be raised. As the carbon-based powder, for example, powder of graphite, carbon black, activated carbon that is electrically conductive, or the like may be raised. A method for supporting platinum or another catalyst metal on the carrier such as carbon is not particularly limited. For example, a method such as powder mixing or liquid-phase mixing may be used. As the latter liquid-phase mixing, for example, a method in which the carrier such as carbon is dispersed in a catalyst component colloid liquid and adsorption is caused or the like may be raised. Further, using an active oxygen removing agent as the carrier as necessary, platinum or another catalyst metal may be supported by a method similar to the above method. The supported state of the catalyst metal such as platinum on the carrier is not particularly limited. For example, the catalyst metal may be atomized and supported on the carrier in a highly dispersed state.

The voltage applicator 19 applies a voltage between the cathode catalyst layer 15 and the anode catalyst layer 16. Specifically, a low electrical potential side terminal of the voltage applicator 19 is connected with the electrically conductive cathode gas diffusion device 33, and a high electrical potential side terminal of the voltage applicator 19 is connected with the electrically conductive anode gas diffusion device 9. The voltage applicator 19 may be in any configuration as long as the voltage applicator 19 may apply a voltage between the cathode catalyst layer 15 and the anode catalyst layer 16. The voltage applicator 19 may be capable of adjusting the applied voltage. In this case, the voltage applicator 19 includes a DC/DC converter in a case of a direct current power source and includes an AC/DC converter in a case of an alternating current power source.

[Configuration of Cathode Gas Diffusion Device]

Figure 3:
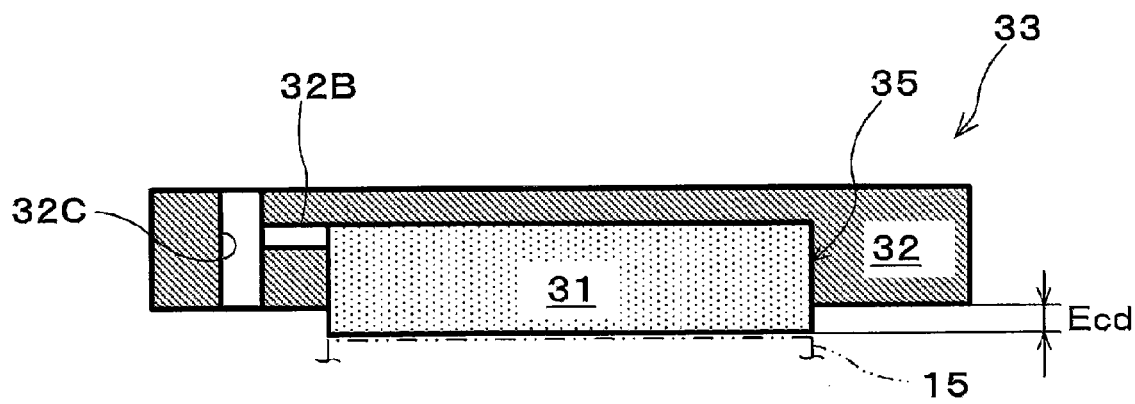
FIG. 3 is a diagram that illustrates one example of a cathode gas diffusion device of the electrochemical hydrogen pump of the embodiment.

FIG. 3 is a diagram that illustrates one example of a cathode gas diffusion device of the electrochemical hydrogen pump of the embodiment.

As described above, the cathode gas diffusion device 33 includes the cathode gas diffusion layer 31 and the cathode separator 32.

The cathode gas diffusion layer 31 is provided on a main surface of the cathode catalyst layer 15, which does not face the electrolyte membrane 14. Further, the cathode gas diffusion layer 31 may be in any configuration as long as the cathode gas diffusion layer 31 includes desired elasticity, desired electrical conductivity, and desired gas permeability. For example, the cathode gas diffusion layer 31 may be configured with a sintered body of metal fiber, which is not illustrated. Materials of the metal fiber may be stainless steel, titanium, a titanium alloy, an aluminum alloy, and so forth, for example. Those materials of the metal fiber are examples, and embodiments are not limited to those examples.

In the electrochemical hydrogen pump 100 of this embodiment, the cathode separator 32 includes the recess portion 35 through which the cathode gas lead out from the cathode gas diffusion layer 31 flows.

Further, the cathode gas diffusion layer 31 is accommodated in the recess portion 35 and is disposed to project from the recess portion 35 in the thickness direction thereof before fastening of the membrane electrode assembly 100B by the fastener 27. A projection amount Ecd of the cathode gas diffusion layer 31 from the recess portion 35 in the thickness direction is set to a proper value in consideration of respective compression amounts or the like of the anode gas diffusion layer 24, the anode catalyst layer 16, and the electrolyte membrane 14 in a case of an action of the electrochemical hydrogen pump 100.

The cathode separator 32 includes a manifold hole 32C through which the cathode gas flows and a cathode gas communication passage 32B that leads out the cathode gas in the recess portion 35 to the manifold hole 32C. That is, in a case where the unit cells 100A are laminated, the tubular cathode gas lead-out manifold is formed with a manifold hole 32A (see FIG. 4) provided to the anode gas diffusion device 9 and the manifold hole 32C. Accordingly, the cathode gas in a high pressure state may be taken out from the cathode gas diffusion layer 31 through the cathode gas communication passage 32B.

[Configuration of Anode Gas Diffusion Device]

Figure 4:
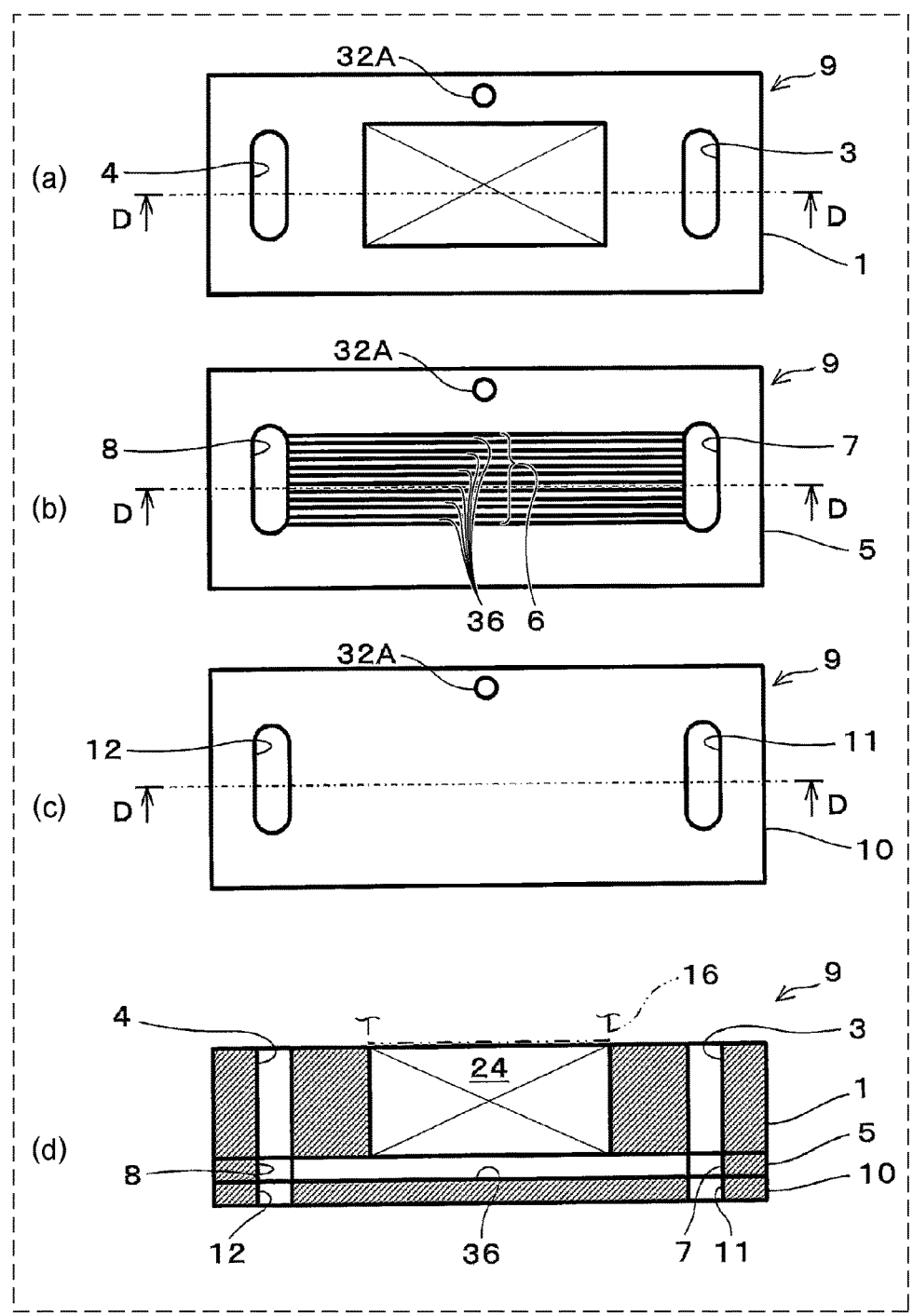
FIG. 4 is a diagram that illustrates one example of an anode gas diffusion device of the electrochemical hydrogen pump of the embodiment.

FIG. 4 is a diagram that illustrates one example of an anode gas diffusion device of the electrochemical hydrogen pump of the embodiment. FIG. 4(a) is a diagram of the anode main body 1 of the anode gas diffusion device 9 in a planar view. FIG. 4(b) is a diagram of the anode gas flow path plate 5 of the anode gas diffusion device 9 in a planar view. FIG. 4(c) is a diagram of the anode end plate 10 of the anode gas diffusion device 9 in a planar view.

FIG. 4(d) is a cross-sectional diagram of the anode gas diffusion device 9. That is, FIG. 4(d) illustrates the cross section of part D-D of the anode gas diffusion device 9 that is illustrated in FIG. 4(a), FIG. 4(b), and FIG. 4(c) in a planar view.

As illustrated in FIG. 4(d), the anode gas diffusion device 9 includes the anode main body 1, the anode gas flow path plate 5, and the anode end plate 10.

As illustrated in FIG. 4(a) and FIG. 4(d), the anode main body 1 includes the anode gas diffusion layer 24, a manifold hole 3 for anode gas introduction, and a manifold hole 4 for leading anode gas out. The anode main body 1 may be configured with metal such as stainless steel, titanium, a titanium alloy, or an aluminum alloy, for example. The thickness of the anode main body 1 may be approximately several hundred μm (for example, approximately 400 μm). Those materials and thickness are examples, and embodiments are not limited to those examples.

The anode gas diffusion layer 24 is provided to the anode catalyst layer 16. A specific configuration of the anode gas diffusion layer 24 will be described later.

The anode gas flow path plate 5 is provided on the main surface of the anode main body 1. In the anode gas diffusion device 9 of this embodiment, the anode gas flow path plate 5 is provided to make surface contact with the main surface of the anode main body 1.

As a material of the anode gas flow path plate 5, stainless steel, titanium, a titanium alloy, an aluminum alloy, or the like may be used, for example. The thickness of the anode gas flow path plate 5 may be approximately several ten μm (for example, approximately 50 μm). Those materials and thickness are examples, and embodiments are not limited to those examples.

As illustrated in FIG. 4(b) and FIG. 4(d), the anode gas flow path plate 5 includes a manifold hole 7 for anode gas introduction, a manifold hole 8 for leading anode gas out, and an anode gas flow path 6.

The manifold hole 7 and the manifold hole 8 are arranged to be respectively opposed to the manifold hole 3 and the manifold hole 4 of the anode main body 1.

In the anode gas diffusion device 9 of this embodiment, the anode gas flow path 6 of the anode gas flow path plate 5 is configured with plural slit holes 36 that communicate with both of the manifold hole 7 and the manifold hole 8. In this case, the manifold hole 7 communicates with a plurality of one ends of the anode gas flow path 6 and is thereby used for anode gas introduction to the anode gas diffusion layer 24. That is, the anode gas that passes through a contact portion between the slit holes 36 of the anode gas flow path 6 and the anode gas diffusion layer 24 is delivered to the anode gas diffusion layer 24. Further, the manifold hole 8 communicates with a plurality of the other ends of the anode gas flow path 6 and is thereby used for leading anode gas out from the anode gas diffusion layer 24.

The anode end plate 10 is provided on the main surface (hereinafter referred to as an opposite surface), which does not face the anode main body 1, of the main surfaces of the anode gas flow path plate 5. Specifically, the plural slit holes 36 of the anode gas flow path plate 5 are covered from the opposite surface by the anode end plate 10.

As a material of the anode end plate 10, stainless steel, titanium, a titanium alloy, an aluminum alloy, or the like may be used, for example. The thickness of the anode end plate 10 may be approximately several ten μm (for example, approximately 50 μm). Those materials and thickness are examples, and embodiments are not limited to those examples.

Further, the anode end plate 10 includes a manifold hole 11 for anode gas introduction and a manifold hole 12 for leading anode gas out. The manifold hole 11 and the manifold hole 12 of the anode end plate 10 are arranged to be respectively opposed to the manifold hole 7 and the manifold hole 8 of the anode gas flow path plate 5.

Consequently, in a case where the unit cells 100A are laminated, the anode gas introduction manifold 28A is formed with the manifold hole 11, the manifold hole 7, the manifold hole 3, and the manifold hole of the cathode separator 32. The anode gas lead-out manifold 29A is formed with the manifold hole 12, the manifold hole 8, the manifold hole 4, and the manifold hole of the cathode separator 32.

In the anode gas diffusion device 9 of this embodiment, the anode end plate 10, the anode gas flow path plate 5, and the anode main body 1 may be integrally bonded by metal joining by welding, soldering, deposition, or the like. For example, surface joining by diffusion joining or the like may be performed for the main surface of the anode end plate 10, the main surface of the anode gas flow path plate 5, and a main surface of the anode main body 1. Accordingly, compared to a case where the anode end plate 10, the anode gas flow path plate 5, and the anode main body 1 are laminated by fixing by a mechanical fastening member, gaps do not remain in the respective joining portions, and the contact resistance (electric resistance) of the anode gas diffusion device 9 may thus be reduced. Then, an increase in power consumption requested for the electrochemical hydrogen pump 100 in a case where a desired voltage is applied to the anode gas diffusion device 9 may be inhibited.

Next, details of the anode gas diffusion layer 24 will be described with reference to the drawings.

Figure 5:
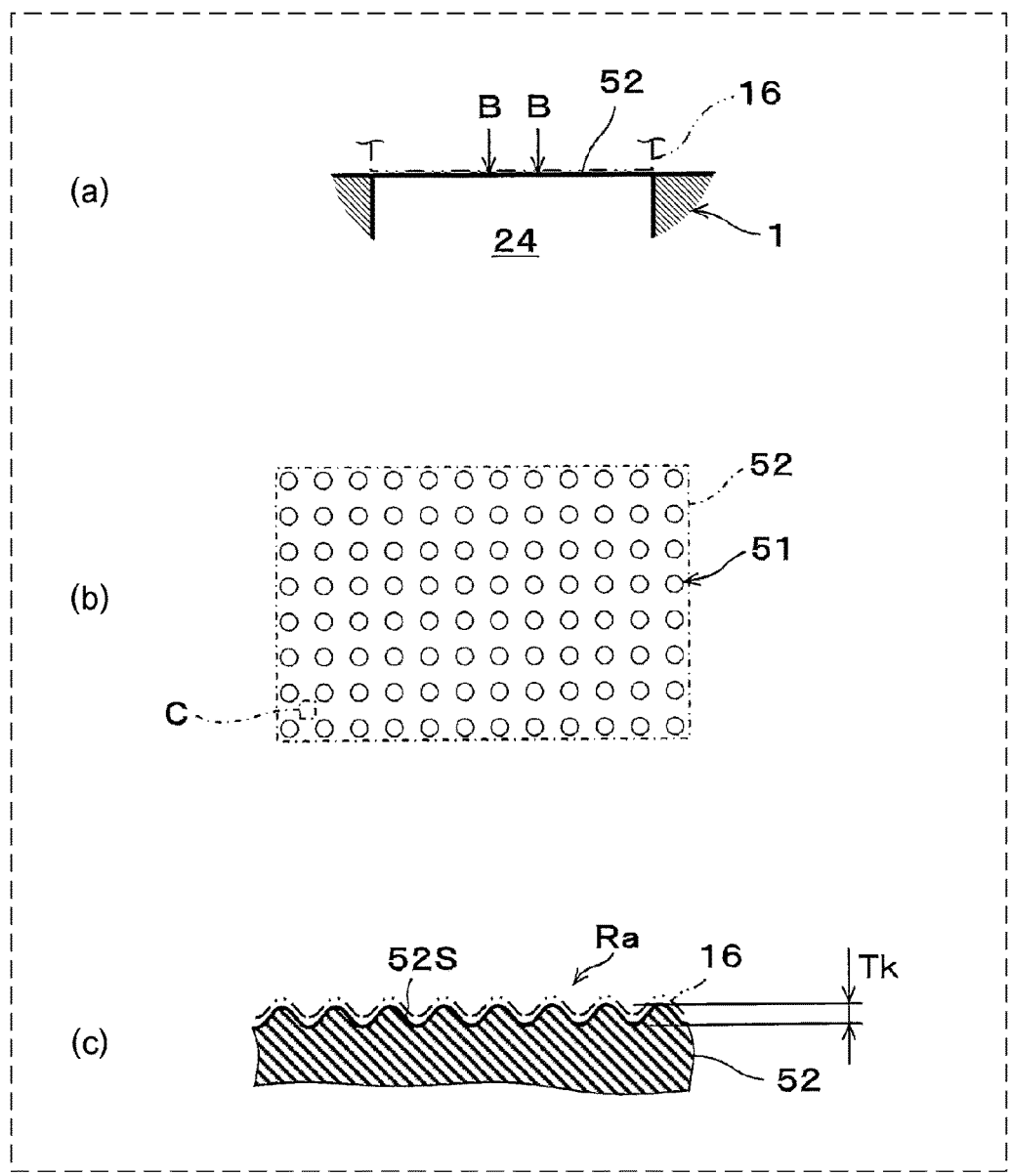
FIG. 5 is a diagram that illustrates one example of an anode gas diffusion layer.

FIG. 5 is a diagram that illustrates one example of an anode gas diffusion layer. FIG. 5(a) is a diagram of a metal steel plate 52 of the anode gas diffusion layer 24 in a side view. FIG. 5(b) is a diagram of part B-B of the metal steel plate 52 in a planar view. FIG. 5(c) is a diagram that illustrates an uneven shape of a main surface 52S of the metal steel plate 52.

As illustrated in FIG. 5, the anode gas diffusion layer 24 includes the metal steel plate 52. Further, the metal steel plate 52 includes plural vent holes 51 through which gas passes. Note that specific examples of the metal steel plate 52 will be described in a first example and a second example.

Here, the main surface 52S of the metal steel plate 52 that neighbors the anode catalyst layer 16 is provided with unevenness, and a difference Tk in the height of unevenness in the thickness direction of the metal steel plate 52 is less than the thickness of the electrolyte membrane 14. Further, surface roughness Ra of a main surface of a metal steel plate is less than the thickness of the electrolyte membrane 14. That is, as illustrated in FIG. 5(b) and FIG. 5(c), the above unevenness is provided in another portion than the vent holes 51 (for example, part C) of the main surface 52S of the metal steel plate 52.

The uneven shape of the main surface 52S of the metal steel plate 52 may be formed three-dimensionally by applying dull-finishing or the like for a surface of the metal steel plate 52, for example. Further, in the dull-finishing, the difference Tk in the height of unevenness in the thickness direction of the metal steel plate 52 and the surface roughness Ra of the main surface of the metal steel plate may be controlled. Note that the above formation method of the unevenness of the main surface 52S of the metal steel plate 52 is an example, and embodiments are not limited to this example. The dull-finishing may be realized by a blast process, for example.

[Fastening Action of Unit Cell by Fastener]

Figure 6:
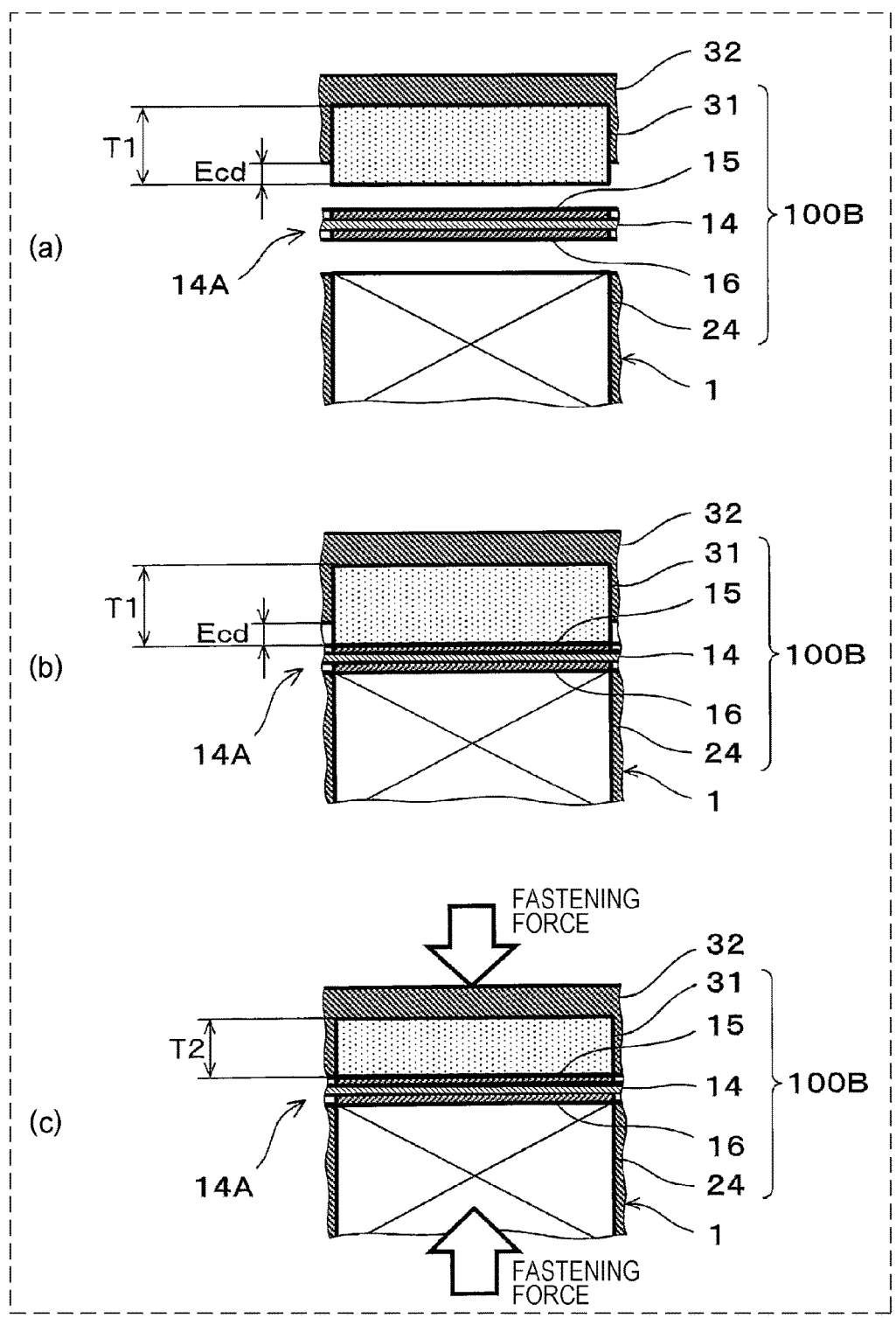
FIG. 6 is a diagram that illustrates one example of a fastening action of a unit cell of the electrochemical hydrogen pump of the embodiment.

FIG. 6 is a diagram that illustrates one example of a fastening action of a unit cell of the electrochemical hydrogen pump of the embodiment.

Note that FIG. 6 illustrates cross-sections of the cathode separator 32, the cathode gas diffusion layer 31, a member in which the cathode catalyst layer 15 and the anode catalyst layer 16 are respectively coated onto the main surfaces of the electrolyte membrane 14 (hereinafter referred to as an electrolyte membrane (with catalyst layers) 14A), and the anode main body 1 that includes the anode gas diffusion layer 24.

First, as illustrated in FIG. 6(a), position adjustment is performed such that the cathode gas diffusion layer 31 is opposed to the electrolyte membrane (with catalyst layers) 14A and the electrolyte membrane (with catalyst layers) 14A is opposed to the anode gas diffusion layer 24.

Next, as illustrated in FIG. 6(b), the cathode gas diffusion layer 31, the electrolyte membrane (with catalyst layers) 14A, and the anode gas diffusion layer 24 are laminated. Here, although the cathode gas diffusion layer 31, the electrolyte membrane (with catalyst layers) 14A, and the anode gas diffusion layer 24 are brought into contact, the fastening force by the fastener 27 is not exerted. Thus, the gap that is correspondent to the projection amount Ecd in the thickness direction of the cathode gas diffusion layer 31 is formed between the main surface of the cathode separator 32 and the electrolyte membrane (with catalyst layers) 14A.

Next, as illustrated in FIG. 6(c), the fastening of the membrane electrode assembly 100B by the fastener 27 is performed. Then, the cathode gas diffusion layer 31 is compressed by the fastening force of the fastener 27, and the main surface of the cathode gas diffusion layer 31, a main surface of the electrolyte membrane (with catalyst layers) 14A, and a main surface of the anode gas diffusion layer 24 are brought into tight contact. In this case, the compression amount (thickness) of the cathode gas diffusion layer 31 is equivalent to the above projection amount Ecd. That is, because the gap between the main surface of the cathode separator 32 and the electrolyte membrane (with catalyst layers) 14A does not remain, the value that results from the subtraction of a thickness T2 at a time after compression of the cathode gas diffusion layer 31 from a thickness T1 at a time before the compression of the cathode gas diffusion layer 31 is equivalent to the above projection amount Ecd.

Consequently, the fastening of the unit cell 100A of the electrochemical hydrogen pump 100 at a time before an operation of the electrochemical hydrogen pump 100 is completed.

[Action of Electrochemical Hydrogen Pump]

In the following, one example of an action (operation) of the electrochemical hydrogen pump 100 of the embodiment will be described with reference to the drawings.

Note that a portion of or the whole following action may be performed by a control program of a controller, which is not illustrated. The controller may be in any configuration as long as the controller has a control function. The controller includes an arithmetic circuit and a storage circuit that stores the control program, for example. Examples of the arithmetic circuit may include an MPU, a CPU, and so forth, for example. Examples of the storage circuit may include a memory, for example. The controller may be configured with a single controller that performs centralized control or may be configured with plural controllers that mutually and cooperatively perform distributed control.

First, the voltage applicator 19 applies a voltage between the cathode separator 32 and the anode gas diffusion device 9.

Next, through the anode gas introduction pipe 28, the anode gas is supplied to the anode gas diffusion device 9. Specifically, the anode gas is supplied from the anode gas introduction pipe 28 to the manifold hole 7 in FIG. 4. Then, because the manifold hole 7 communicates with one ends of the anode gas flow path 6 of the anode gas flow path plate 5, the anode gas is delivered from the manifold hole 7 to the anode gas flow path 6.

Here, a portion of the anode gas that flows through the anode gas flow path 6 is delivered to the anode gas diffusion layer 24 of the anode main body 1. Because the anode gas diffusion layer 24 includes a gas diffusion function, the anode gas that flows from the anode gas flow path 6 toward the main surface (hereinafter referred to as an opposite surface) of the anode gas diffusion layer 24, which does not face the anode gas flow path plate 5, may pass through the opposite surface while being uniformly diffused by the anode gas diffusion layer 24. Accordingly, the anode gas is uniformly supplied to the anode catalyst layer 16 that is arranged on the opposite surface of the anode gas diffusion layer 24. Note that excess anode gas that does not pass through the above opposite surface is delivered to the manifold hole 8 that communicates with the other ends of the anode gas flow path 6 of the anode gas flow path plate 5 and is discharged to the anode gas lead-out pipe 29. As the anode gas, for example, reformed gas containing hydrogen, hydrogen-containing gas that is generated by water electrolysis, or the like may be raised.

Consequently, hydrogen in the anode gas liberates an electron on the anode catalyst layer 16 and becomes a proton ($H^+$) (formula (1)). The liberated electron moves to the cathode catalyst layer 15 via the voltage applicator 19.

Meanwhile, a proton permeates the inside of the electrolyte membrane 14 while accompanying a water molecule and moves to the cathode catalyst layer 15. In the cathode catalyst layer 15, the reduction reaction of the proton that permeates the electrolyte membrane 14 and an electron takes place, and the cathode gas (hydrogen gas) is thereby generated (formula (2)).

Accordingly, purification of hydrogen gas is highly efficiently performed from the hydrogen gas (anode gas) that contains impurities such as $CO_2$ gas. Note that the anode gas may contain CO gas as an impurity. In this case, because CO gas lowers catalyst activities of the anode catalyst layer 16 and so forth, it is desirable that CO gas is removed by a CO remover (for example, a transformer, a CO selective oxidizer, or the like), which is not illustrated.

Then, a pressure drop of the cathode gas lead-out pipe 30 is increased, a voltage E of the voltage applicator 19 is raised, and a gas pressure P2 of a cathode thereby becomes a high pressure. Specifically, the relationship among a gas pressure P1 of an anode, a gas pressure P2 of a cathode, and the voltage E of the voltage applicator 19 is formulated by the following formula (3).

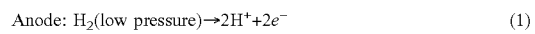

Anode: $H_2$(low pressure)$\rightarrow 2H^+ + 2e^-$     (1)

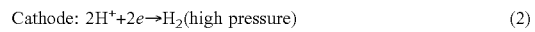

Cathode: $2H^+ + 2e^- \rightarrow H_2$(high pressure)     (2)

$$E = (RT/2F)\ln(P2/P1) + ir \quad (3)$$

In formula (3), R represents the gas constant (8.3145 J/K·mol), T represents a temperature (K), F represents the Faraday constant (96485 C/mol), P2 represents the gas pressure of the cathode, P1 represents the gas pressure of the anode, i represents current density (A/cm$^2$), and r represents a cell resistance (Ω·cm$^2$).

It may easily be understood from formula (3) that the voltage E of the voltage applicator 19 is raised and the gas pressure P2 of the cathode may thereby be caused to rise. Note that the pressure drop of the cathode gas lead-out pipe 30 may be increased or decreased in accordance with the opening degree of a switch valve that is provided to the cathode gas lead-out pipe 30, for example.

Then, in a case where the gas pressure of the cathode gas diffusion layer 31 becomes a prescribed pressure or higher, the pressure drop of the cathode gas lead-out pipe 30 is decreased (for example, the opening degree of the switch valve is made higher), and the cathode gas of the cathode gas diffusion layer 31 is thereby filled in a high-pressure hydrogen tank, which is not illustrated, through the cathode gas lead-out pipe 30. On the other hand, in a case where the gas pressure of the cathode gas diffusion layer 31 becomes lower than a prescribed pressure, the pressure drop of the cathode gas lead-out pipe 30 is increased (for example, the opening degree of the switch valve is made lower), and the cathode gas diffusion layer 31 is thereby disconnected from the high-pressure hydrogen tank. Accordingly, the reverse flow of the cathode gas of the high-pressure hydrogen tank to the cathode gas diffusion layer 31 is inhibited.

In such a manner, the cathode gas (hydrogen gas) of high purity is pressurized to a desired target pressure and is filled in the high-pressure hydrogen tank by the electrochemical hydrogen pump 100.

In the above pressurization action of the cathode gas, the gas pressure P2 of the cathode becomes a high pressure, and the electrolyte membrane 14, the anode catalyst layer 16, and the anode gas diffusion layer 24 are pressed. Then, each of the electrolyte membrane 14, the anode catalyst layer 16, and the anode gas diffusion layer 24 is compressed by this pressing. Here, in a case where the tightness of contact between the cathode catalyst layer 15 and the cathode gas diffusion layer 31 is low, a gap is likely to occur between both of those. Hypothetically, in a case where the gap occurs between the cathode catalyst layer 15 and the cathode gas diffusion layer 31, the contact resistance between both of those increases. Then, because the voltage E applied by the voltage applicator 19 increases, the operation efficiency of the electrochemical hydrogen pump 100 may be lowered.

Accordingly, in the electrochemical hydrogen pump 100 of this embodiment, as illustrated in FIG. 3, the cathode gas diffusion layer 31 is configured to project by the projection amount Ecd in the thickness direction from the recess portion 35 of the cathode separator 32 before the fastening of the membrane electrode assembly 100B by the fastener 27. Further, as illustrated in FIG. 6(c), the cathode gas diffusion layer 31 is compressed by the projection amount Ecd by the fastener 27 during the fastening of the membrane electrode assembly 100B. Thus, even in a case where each of the anode gas diffusion layer 24, the anode catalyst layer 16, and the electrolyte membrane 14 is compressed and deformed, the cathode gas diffusion layer 31 elastically deforms in the direction in which the cathode gas diffusion layer 31 is recovered from the compressed thickness by the fastener 27 to the uncompressed thickness, and the contact between the cathode gas diffusion layer 31 and the electrolyte membrane 14 (the cathode catalyst layer 15) may appropriately be maintained.

Further, here, when each of the anode gas diffusion layer 24, the anode catalyst layer 16, and the electrolyte membrane 14 is compressed and deformed, as described above, the electrolyte membrane 14 (the anode catalyst layer 16) and the anode gas diffusion layer 24 are pressed by a gas pressure of the cathode gas diffusion layer 31.

Thus, the membrane electrode assembly 100B of this embodiment may suppress the increase in the contact resistance between the electrolyte membrane 14 (the anode catalyst layer 16) and the anode gas diffusion layer 24 compared to related art.

Specifically, the main surface 52S of the metal steel plate 52 and the main surface of the electrolyte membrane 14 (the anode catalyst layer 16) neighbor each other in a planar manner along the unevenness on the main surface 52S of the metal steel plate 52 due to the above pressing. Then, the unevenness is provided to the main surface 52S of the metal steel plate 52, and a large contact area between the main surface 52S of the metal steel plate 52 and the main surface of the electrolyte membrane 14 (the anode catalyst layer 16) may thereby be obtained. Thus, compared to a case where unevenness, which is of a dimension equal to or greater than a predetermined dimension, is not provided to the main surface 52S of the metal steel plate 52, the increase in the contact resistance between the main surface 52S of the metal steel plate 52 and the main surface of the electrolyte membrane 14 (the anode catalyst layer 16) is suppressed.

Here, as the difference Tk of the height of unevenness in the thickness direction of the metal steel plate 52 is greater, the possibility of damage to the electrolyte membrane 14 (the anode catalyst layer 16) due to the unevenness of the main surface 52S of the metal steel plate 52 becomes higher in a case where the main surface of the metal steel plate 52 and the main surface of the electrolyte membrane 14 (the anode catalyst layer 16) neighbor each other in a planar manner along the unevenness. However, in the membrane electrode assembly 100B of this embodiment, because the difference Tk in the height of such unevenness is less than the thickness of the electrolyte membrane 14, deformation (expansion) of the electrolyte membrane 14 (the anode catalyst layer 16) due to the unevenness is inhibited, and the above possibility may thereby be reduced. Further, as the surface roughness Ra of the main surface 52S of the metal steel plate 52 is greater, the possibility of damage to the electrolyte membrane 14 (the anode catalyst layer 16) due to the unevenness of the main surface 52S of the metal steel plate 52 becomes higher in a case where the main surface 52S of the metal steel plate 52 and the main surface of the electrolyte membrane 14 (the anode catalyst layer 16) neighbor each other in a planar manner along the unevenness. However, in the membrane electrode assembly 100B of this embodiment, because such surface roughness Ra is less than the thickness of the electrolyte membrane 14, deformation (expansion) of the electrolyte membrane 14 (the anode catalyst layer 16) due to the unevenness is inhibited, and the above possibility may thereby be reduced.

That is, in the membrane electrode assembly 100B of this embodiment, while the possibility of damage to the electrolyte membrane 14 (the anode catalyst layer 16) due to the unevenness of the main surface 52S of the metal steel plate 52 is reduced, the contact area between the main surface 52S of the metal steel plate 52 and the main surface of the electrolyte membrane 14 (the anode catalyst layer 16) may appropriately be secured.

In the above configuration, the electrochemical hydrogen pump 100 of this embodiment may inhibit the increase in power consumption requested for the electrochemical hydrogen pump 100 in a case where a desired voltage is applied to the membrane electrode assembly 100B of this embodiment.

Modification Example

Figure 7:
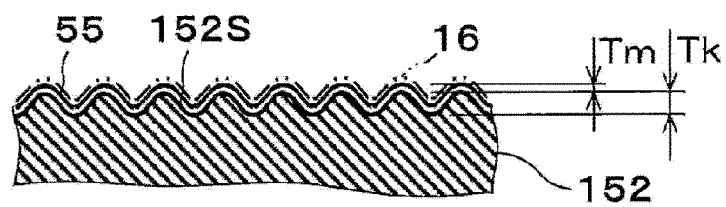
FIG. 7 is a diagram that illustrates one example of the membrane electrode assembly of a modification example of the embodiment.

FIG. 7 is a diagram that illustrates one example of the membrane electrode assembly of a modification example of the embodiment. FIG. 7 illustrates an uneven shape of a main surface 152S of a metal steel plate 152 of the anode gas diffusion layer 24.

As for the membrane electrode assembly 100B of the modification example of the embodiment, in the membrane electrode assembly 100B of the first aspect or the second aspect, the main surface 152S of the metal steel plate 152 that neighbors the anode catalyst layer 16 includes a plating layer 55, and a depth Tk of the unevenness of the main surface 152S of the metal steel plate 152 is a deeper depth than a membrane thickness Tm of the plating layer 55. Further, the electrochemical hydrogen pump 100 of the modification example of the embodiment includes the voltage applicator 19 that applies a voltage between the cathode catalyst layer 15 and the anode catalyst layer 16 and the membrane electrode assembly 100B.

In such a configuration, the plating layer 55 provided to the main surface 152S of the metal steel plate 152 may reduce the contact resistance between the main surface 152S of the metal steel plate 152 and the anode catalyst layer 16 and may protect the metal steel plate 152 from corrosion.

The plating layer 55 may be in any configuration as long as the above reduction in the contact resistance and corrosion protection for the metal steel plate 152 may be performed. The plating layer 55 may be a gold plating layer or a platinum plating layer, for example. Such a plating layer 55 may be formed by applying electroplating to the main surface 152S of the metal steel plate 152, for example.

Here, as the membrane thickness Tm of the plating layer 55 is thicker, the unevenness of the main surface 152S of the metal steel plate 152 becomes more even. For example, in a case where the membrane thickness Tm of the plating layer 55 provides a sufficiently thick membrane, it is possible that the above unevenness is lost. Then, in a case where a main surface of the metal steel plate 152 and the main surface of the electrolyte membrane 14 (the anode catalyst layer 16) neighbor each other in a planar manner along the unevenness, the contact area between the main surface 152S of the metal steel plate 152 and the main surface of the electrolyte membrane 14 (the anode catalyst layer 16) may become small compared to a case where the plating layer 55 is not provided.

Accordingly, in the membrane electrode assembly 100B of this modification example, as described above, the depth Tk of the unevenness of the main surface 152S of the metal steel plate 152 is set to a deeper depth than the membrane thickness Tm of the plating layer 55.

For example, in a case where the thickness of the electrolyte membrane 14 is approximately 50 µm and the plating layer 55 is a gold plating layer of approximately 1 µm, the depth Tk of the unevenness of the main surface 152S of the metal steel plate 152 may be set to an intermediate thickness between those thicknesses (that is, 1 µm<Tk<50 µm). Note that those thicknesses are examples, and embodiments are not limited to those examples. Accordingly, even in a case where the plating layer 55 is provided to the main surface 152S of the metal steel plate 152, the unevenness with an adequate depth Tk is secured on the main surface 152S of the metal steel plate 152. Thus, the above contact area may be maintained at a desired value.

Except for the above features, the membrane electrode assembly 100B of this modification example may be similar to the membrane electrode assembly 100B of the embodiment.

First Example

Figure 8:
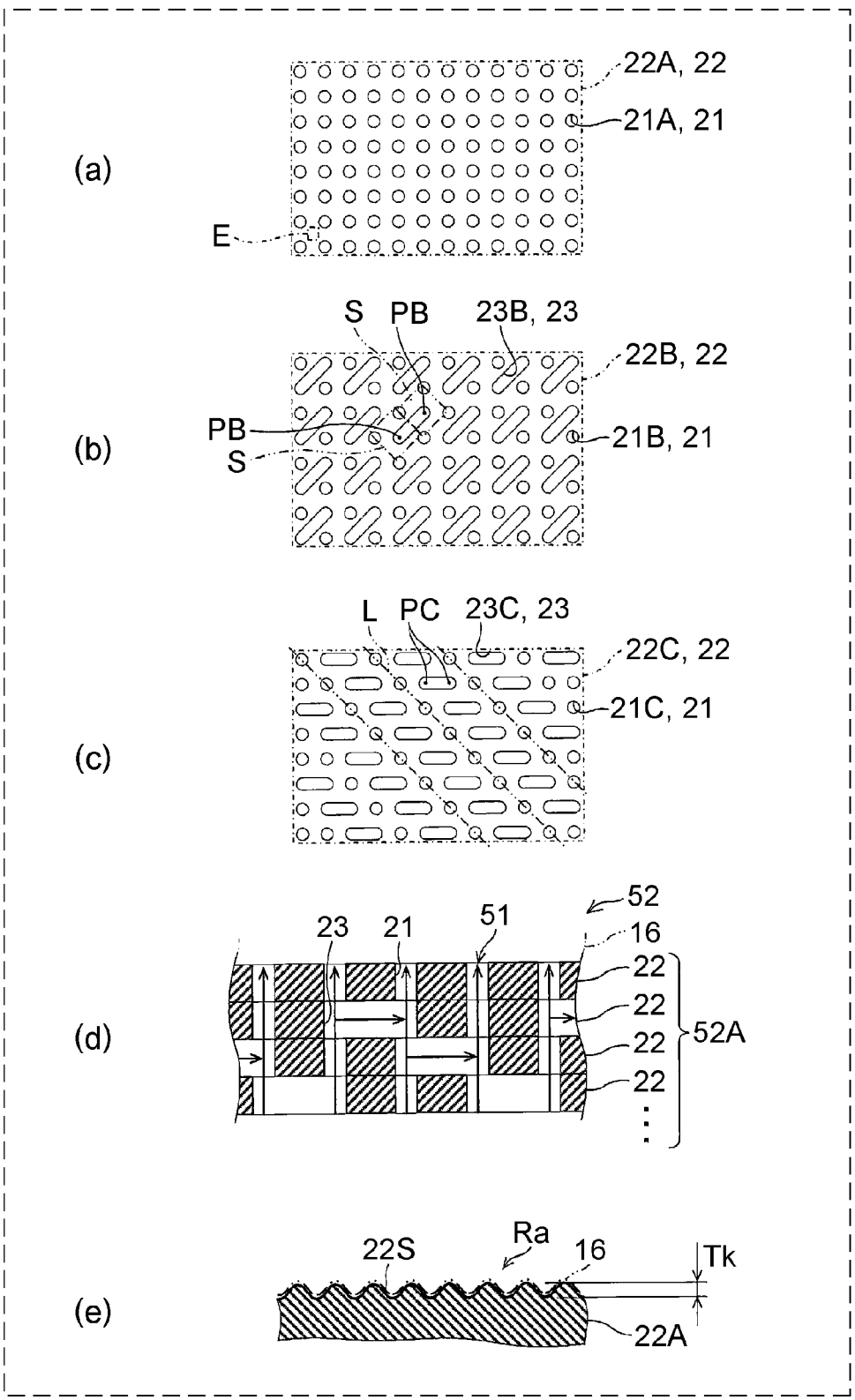
FIG. 8 is a diagram that illustrates one example of the membrane electrode assembly of a first example of the embodiment.

FIG. 8 is a diagram that illustrates one example of the membrane electrode assembly of the first example of the embodiment. FIG. 8(a), FIG. 8(b), and FIG. 8(c) are diagrams of a metal steel sheet 22 of the metal steel plate 52 of the anode gas diffusion layer 24 in a planar view. FIG. 8(d) is a diagram that illustrates a cross section of the metal steel plate 52. FIG. 8(e) is a diagram that illustrates an uneven shape of a main surface 22S of a metal steel sheet 22A of the uppermost layer of the metal steel plate 52.

As for the membrane electrode assembly 100B of the first example of the embodiment, in the membrane electrode assembly 100B of any of the first aspect, the second aspect, and the modification example of the embodiment, the metal steel plate 52 includes a laminated body 52A of plural metal steel sheets 22 that have plural through holes 21, and the above vent hole 51 is configured by interconnection between the through holes 21 of the neighboring metal steel sheets 22. In this case, at least one metal steel sheet 22 among the plural metal steel sheets 22 has an interconnection path 23 that interconnects the through holes 21. Further, the electrochemical hydrogen pump 100 of the first example of the embodiment includes the voltage applicator 19 that applies a voltage between the cathode catalyst layer 15 and the anode catalyst layer 16 and the membrane electrode assembly 100B.

Here, the vent hole 51 of the metal steel plate 52 may have any form as long as the vent hole 51 is configured by interconnection between the through holes 21 of the neighboring metal steel sheets 22. For example, in the example illustrated in FIG. 8(d), the laminated body 52A is provided with the through holes 21 and both end portions of the interconnection path 23 that configure a gas flow path (hereinafter referred to as a reference gas flow path) which extends in the direction to pass through the laminated body 52A and the interconnection path 23 that configures a gas flow path which extends in a parallel direction with a main surface of the laminated body 52A so as to branch from the reference gas flow path and to reach the next reference gas flow path. In such a manner, the vent hole 51 of the metal steel plate 52 is configured by interconnection between the through holes 21 of the neighboring metal steel sheets 22.

Another portion of the metal steel sheet 22 than the through holes 21 is configured not to include gas permeability. For example, the thickness of the metal steel sheet 22 may be approximately several ten to several hundred µm (for example, approximately 100 µm). However, embodiments are not limited to this. The metal steel sheet 22 may be fabricated by casting or rolling of metal, for example. Because there are related art of fabrication methods by casting and rolling of metal, a detailed description will not be made.

In a planar view of the uppermost layer of such a laminated body 52A, for example, as illustrated in FIG. 8(a), plural through holes 21A may be formed in the metal steel sheet 22A of the laminated body 52A at regular pitches in the longitudinal and lateral directions and in a matrix manner (lattice manner). The shape of the through hole 21A may be any shape. The through hole 21A may be, for example, a circular hole with a diameter of approximately several ten µm (for example, approximately 50 µm). As a material of the metal steel sheet 22A, stainless steel, titanium, or the like may be used, for example. However, embodiments are not limited to this. Note that the metal steel sheet 22A of FIG. 8(a) does not include the above interconnection path.

As illustrated in FIG. 8(a) and FIG. 8(e), unevenness is provided in another portion than the through holes 21A (for example, part E) of the main surface 22S of the metal steel sheet 22A that neighbors the anode catalyst layer 16. For example, in a case where a metal member is rolled by a roll, a surface of a rolling roll is evenly roughened, and the dull-finishing is thereby performed for the main surface 22S of the metal steel sheet 22A. Accordingly, the unevenness may be provided to the main surface 22S of the metal steel sheet 22A. Note that the dimension of the unevenness of the main surface 22S of the metal steel sheet 22A and work and effect that are provided by the unevenness are similar to the embodiment. Thus, a description will not be made.

Further, as illustrated in FIG. 8(b), plural through holes 21B may be formed in a metal steel sheet 22B of the laminated body 52A at regular pitches in the longitudinal and lateral directions. The shape of the through hole 21B may be any shape. The through hole 21B may be, for example, a circular hole with a diameter of approximately several ten µm (for example, approximately 50 µm). As a material of the metal steel sheet 22B, stainless steel, titanium, or the like may be used, for example. However, embodiments are not limited to this.

In the example illustrated in FIG. 8(b), the through holes 21B are aligned in the longitudinal and lateral directions such that a rhombus S indicated by two-dot chain lines is formed in a case where the centers of the neighboring through holes 21B are connected. In this example, an interconnection path 23B is formed to become an opening that obliquely connects respective centers PB of the neighboring rhombi S. Further, it may be considered that the interconnection path 23B extends in a parallel direction with a first direction in which the through holes 21B are mutually connected without crossing the interconnection path 23B. Further, it may also be considered that the interconnection path 23B is formed to become an opening that connects the middle points (PB) of straight lines which mutually connect the neighboring through holes 21B at longer separate distances among the neighboring through holes 21B in different directions from the first direction (the neighboring through holes 21B in the longitudinal direction and the lateral direction). Further, for example, in a case where the metal steel sheet 22B and the metal steel sheet 22A are laminated, the through holes 21B and the interconnection paths 23B are aligned such that the through hole 21A overlaps with the through hole 21B and the through holes 21A overlap with both end portions of the interconnection path 23B. Thus, in this case, the interconnection path 23B may interconnect the through holes 21A.

The shape of the interconnection path 23B may be any shape. For example, in a case where the through hole 21B is a circular hole with a diameter of approximately several ten μm (for example, approximately 50 μm), the interconnection path 23B may be a slit with a width of approximately several ten (for example, approximately 50 μm).

Further, as illustrated in FIG. 8(c), plural through holes 21C may be formed in a metal steel sheet 22C of the laminated body 52A. The shape of the through hole 21C may be any shape. The through hole 21C may be, for example, a circular hole with a diameter of approximately several ten μm (for example, approximately 50 μm). As a material of the metal steel sheet 22C, stainless steel, titanium, or the like may be used, for example. However, embodiments are not limited to this.

In the example illustrated in FIG. 8(c), the through holes 21C are aligned in the longitudinal and lateral directions such that an inclined straight line L indicated by two-dot chain lines is formed in a case where the centers of the neighboring through holes 21C are connected without crossing an interconnection path 23C. In this example, the interconnection path 23C is formed to become an opening that laterally connects two intermediate points PC in a case where the straight line that mutually connects the neighboring through holes 21C in the lateral direction is divided into three equivalent parts. Further, for example, in a case where the metal steel sheet 22A and the metal steel sheet 22C are laminated, the through holes 21C and the interconnection paths 23C are aligned such that the through hole 21A overlaps with the through hole 21C and the through holes 21A overlap with both end portions of the interconnection path 23C. Thus, in this case, the interconnection path 23C may interconnect the through holes 21A.

The shape of the interconnection path 23C may be any shape. For example, in a case where the through hole 21C is a circular hole with a diameter of approximately several ten μm (for example, approximately 50 μm), the interconnection path 23C may be a slit with a width of approximately several ten (for example, approximately 50 μm).

Consequently, the anode gas diffusion layer 24 may uniformly diffuse the anode gas. That is, the laminated body 52A of the anode gas diffusion layer 24 includes the interconnection paths 23, and the gas that passes through the inside of the laminated body 52A may thereby be delivered not only in one direction but also arbitrary directions. Then, the metal steel sheets 22 that have different arrangement patterns of the interconnection paths 23 are laminated in the laminated body 52A, and the direction of a gas flow in the laminated body 52A may arbitrarily be set. Accordingly, gas diffusion performance of the metal steel plate 52 of the anode gas diffusion layer 24 is improved.

Further, for example, in a case where a configuration is employed in which the anode gas is caused to flow into the through holes 21 of the laminated body 52A through gas flow paths of flow path members, which are not illustrated, and where the laminated body 52A does not include the above interconnection path, gas does not flow through the through holes 21 of the laminated body 52A that are positioned on vertical lines in portions in which the gas flow paths of the flow path members are not provided, and the anode gas diffusion of the laminated body 52A possibly becomes non-uniform. However, the anode gas diffusion layer 24 may cause the anode gas to flow through the through holes 21 of such a laminated body 52A via the above interconnection paths 23 and may thus inhibit non-uniform anode gas diffusion.

Note that any combination of the metal steel sheets 22 that have different arrangement patterns of the interconnection paths 23 may be used. For example, a metal steel sheet that has a different arrangement pattern from the metal steel sheet 22C may be a metal steel sheet in which the positions of the interconnection paths 23C are laterally offset or may be the metal steel sheet 22B. Further, the shapes and dimensions of the through hole 21 and the interconnection path 23 in the above description are examples, and embodiments are not limited to these examples.

Except for the above features, the membrane electrode assembly 100B of this example may be similar to the membrane electrode assembly 100B of the embodiment or the modification example of the embodiment.

Second Example

Figure 9:
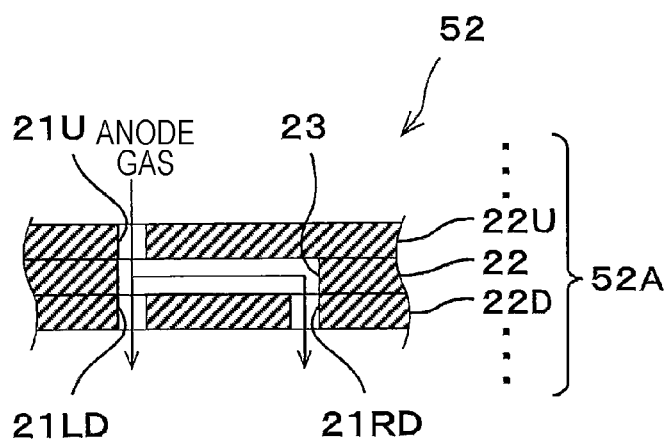
FIG. 9 is a diagram that illustrates one example of the membrane electrode assembly of a second example of the embodiment.

FIG. 9 is a diagram that illustrates one example of the membrane electrode assembly of the second example of the embodiment. FIG. 9 illustrates a cross section of the metal steel plate 52 of the anode gas diffusion layer 24.

As for the membrane electrode assembly 100B of the second example of the embodiment, in the membrane electrode assembly 100B of the first example of the embodiment, the interconnection path 23 interconnects a through hole 21LD and a through hole 21RD that are provided to the same metal steel sheet 22D which neighbors the metal steel sheet 22 provided with the interconnection path 23. Further, the electrochemical hydrogen pump 100 of the second example of the embodiment includes the voltage applicator 19 that applies a voltage between the cathode catalyst layer 15 and the anode catalyst layer 16 and the membrane electrode assembly 100B.

That is, the interconnection path 23 interconnects the left through hole 21LD and the right through hole 21RD that are provided to the same metal steel sheet 22D below the metal steel sheet 22 provided with the interconnection path 23. Note that the through hole 21LD and the through hole 21RD are separated by the length of the interconnection path 23 in a parallel direction with the main surface of the laminated body 52A.

Further, as illustrated in FIG. 9, a metal steel sheet 22U above the metal steel sheet 22 provided with the interconnection path 23 may include a through hole 21U that is immediately above the through hole 21LD. In this case, the interconnection path 23 interconnects the through hole 21U and the through hole 21RD. Note that the metal steel sheet 22U above the metal steel sheet 22 provided with the interconnection path 23 may include a through hole (not illustrated) that is immediately above the through hole 21RD. In this case, the interconnection path 23 interconnects the above-described through hole, which is immediately above the through hole 21RD, and the through hole 21LD.

Consequently, the laminated body 52A includes the interconnection paths 23, and the anode gas that passes through the inside of the laminated body 52A may thereby be delivered not only in the direction to pass through the laminated body 52A but also the parallel direction with the main surface of the laminated body 52A. Thus, the gas diffusion performance of the metal steel plate 52 of the anode gas diffusion layer 24 is improved.

Except for the above features, the membrane electrode assembly 100B of this example may be similar to the membrane electrode assembly 100B of the first example of the embodiment.

Third Example

Figure 10:
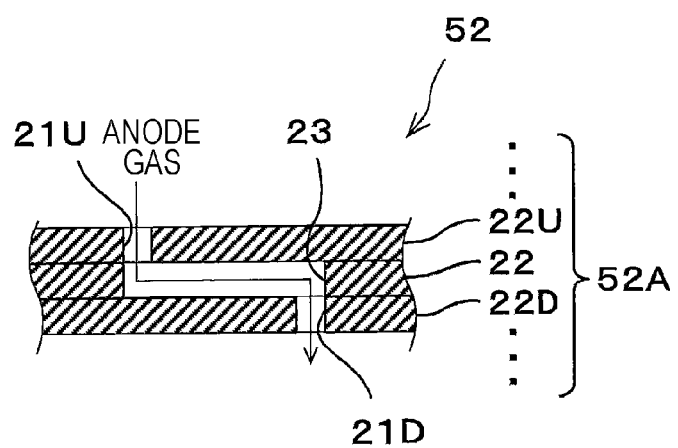
FIG. 10 is a diagram that illustrates one example of the membrane electrode assembly of a third example of the embodiment.

FIG. 10 is a diagram that illustrates one example of the membrane electrode assembly of a third example of the embodiment. FIG. 10 illustrates a cross section of the metal steel plate 52 of the anode gas diffusion layer 24.

As for the membrane electrode assembly 100B of the third example of the embodiment, in the membrane electrode assembly 100B of the first example of the embodiment, the interconnection path 23 interconnects the through hole 21U and a through hole 21D that are respectively provided to the different metal steel sheet 22U and metal steel sheet 22D which neighbor the metal steel sheet 22 provided with the interconnection path 23. Further, the electrochemical hydrogen pump 100 of the third example of the embodiment includes the voltage applicator 19 that applies a voltage between the cathode catalyst layer 15 and the anode catalyst layer 16 and the membrane electrode assembly 100B.

That is, the interconnection path 23 interconnects the through hole 21U of the metal steel sheet 22U above the metal steel sheet 22 provided with the interconnection path 23 and the through hole 21D of the metal steel sheet 22D below the metal steel sheet 22 provided with the interconnection path 23. Note that the through hole 21U and the through hole 21D are deviated by the length of the interconnection path 23 in the parallel direction with the main surface of the laminated body 52A.

Consequently, the laminated body 52A includes the interconnection paths 23, and the anode gas that passes through the inside of the laminated body 52A may thereby be delivered not only in the direction to pass through the laminated body 52A but also the parallel direction with the main surface of the laminated body 52A. Thus, the gas diffusion performance of the metal steel plate 52 of the anode gas diffusion layer 24 is improved.

Except for the above features, the membrane electrode assembly 100B of this example may be similar to the membrane electrode assembly 100B of the first example of the embodiment.

Fourth Example

Figure 11:
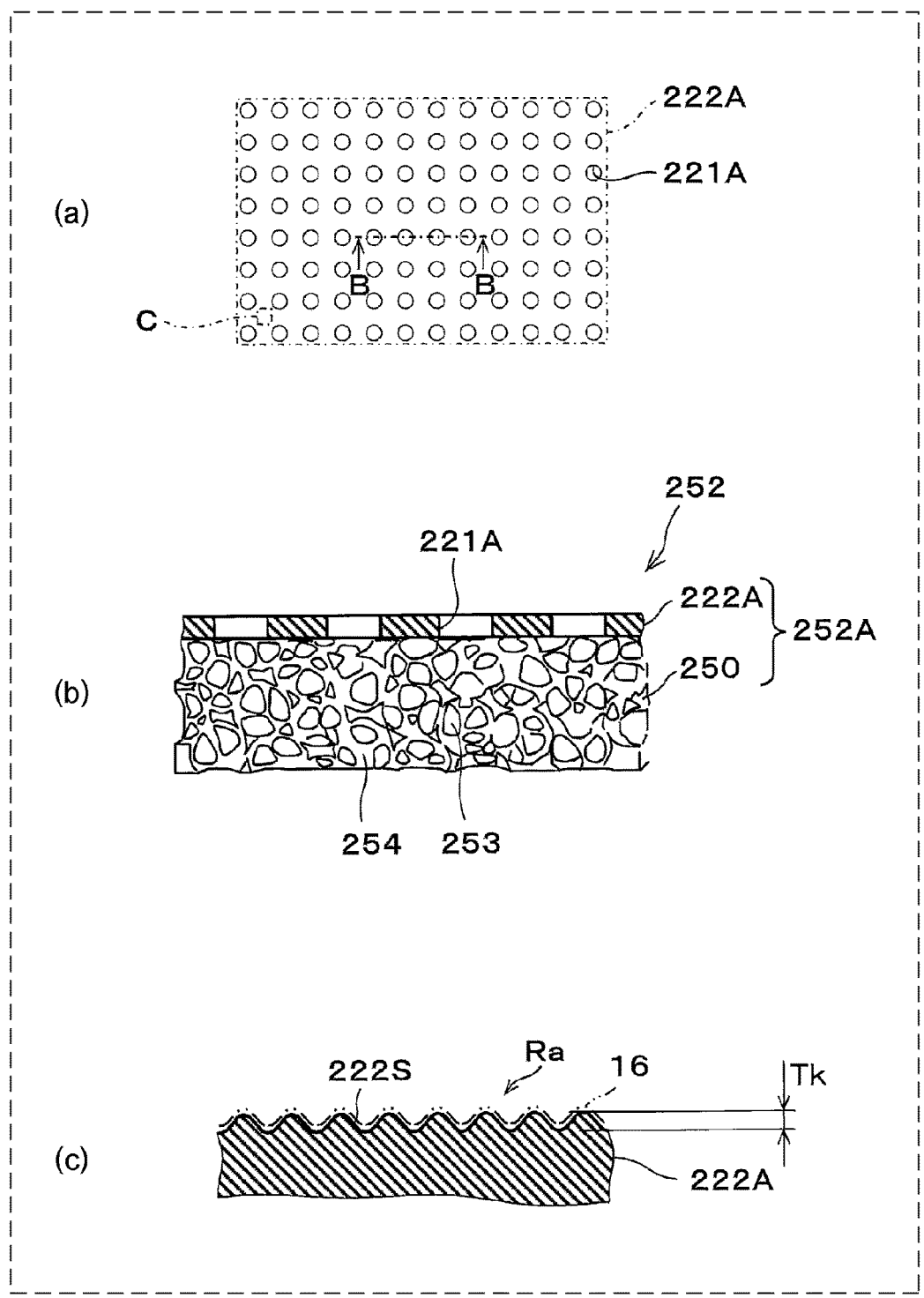
FIG. 11 is a diagram that illustrates one example of the membrane electrode assembly of a fourth example of the embodiment.

FIG. 11 is a diagram that illustrates one example of the membrane electrode assembly of a fourth example of the embodiment. FIG. 11(a) is a diagram of a metal steel sheet 222A of a metal steel plate 252 of the anode gas diffusion layer 24 in a planar view. FIG. 11(b) is a diagram that illustrates a cross section of the metal steel plate 252. FIG. 11(c) is a diagram that illustrates an uneven shape of a main surface 222S of the metal steel sheet 222A of the metal steel plate 252.

As for the membrane electrode assembly 100B of the fourth example of the embodiment, in the membrane electrode assembly 100B of any of the first aspect, the second aspect, and the modification example of the embodiment, the anode gas diffusion layer 24 further includes a sintered metal sheet 250 that diffuses gas. The sintered metal sheet 250 is provided on a main surface side of the metal steel plate 252 that does not neighbor the anode catalyst layer 16. Further, the electrochemical hydrogen pump 100 of the fourth example of the embodiment includes the voltage applicator 19 that applies a voltage between the cathode catalyst layer 15 and the anode catalyst layer 16 and the membrane electrode assembly 100B.

The anode gas diffusion layer 24 may be in any configuration as long as the anode gas diffusion layer 24 further includes the sintered metal sheet 250 that diffuses gas.

For example, in the example illustrated in FIG. 11(b), the sintered metal sheet 250 that is disclosed in Japanese Unexamined Patent Application Publication No. 2009-277583 and so forth configures a portion of the anode gas diffusion layer 24, and the metal steel sheet 222A configures the metal steel sheet in the metal steel plate 252 that neighbors the anode catalyst layer 16.

The sintered metal sheet 250 is obtained by sintering metal powder and includes a porous configuration formed with a skeleton portion 254 and plural vacant hole portions 253. The vacant hole portion 253 is a space with a diameter of approximately several ten μm (for example, approximately 50 μm) and communicates with each other. Accordingly, in a case where the anode gas passes through the sintered metal sheet 250 in the thickness direction, the anode gas may be diffused. Note that the sintered metal sheet 250 is processed to have a smooth surface.

In a planar view of the uppermost layer of such a laminated body 252A, as illustrated in FIG. 11(a), the metal steel sheet 222A includes plural through holes 221A. Another portion of the metal steel sheet 222A than the through holes 221A is configured not to include gas permeability. For example, the thickness of the metal steel sheet 222A may be approximately several ten to several hundred (for example, approximately 100 μm). However, embodiments are not limited to this. The metal steel sheet 222A may be fabricated by casting or rolling of metal, for example. Because there are related art of fabrication methods by casting and rolling of metal, a detailed description will not be made.

The plural through holes 221A may be formed in the metal steel sheet 222A at regular pitches in the longitudinal and lateral directions and in a matrix manner (lattice manner). The shape of the through hole 221A may be any shape. The through hole 221A may be, for example, a circular hole with a diameter of approximately several ten μm (for example, approximately 50 μm). As a material of the metal steel sheet 222A, stainless steel, titanium, or the like may be used, for example. However, embodiments are not limited to this.

As illustrated in FIG. 11(a) and FIG. 11(c), unevenness is provided in another portion than the through holes 221A (for example, part C) of the main surface 222S of the metal steel sheet 222A. For example, in a case where a metal member is rolled by the roll, the surface of the rolling roll is evenly roughened, and the dull-finishing is thereby performed for the main surface 222S of the metal steel sheet 222A. Accordingly, the unevenness may be provided to the main surface 222S of the metal steel sheet 222A. Note that the dimension of the unevenness of the main surface 222S of the metal steel sheet 222A and work and effect that are provided by the unevenness are similar to the embodiment. Thus, a description will not be made.

Consequently, via the vacant hole portions 253 of the sintered metal sheet 250, the anode gas that passes through the inside of the laminated body 252A may thereby be delivered not only in the direction to pass through the laminated body 252A but also the parallel direction with the main surface of the laminated body 252A. Thus, the gas diffusion performance of the metal steel plate 252 of the anode gas diffusion layer 24 is improved. Note that the shapes and dimensions of the vacant hole portion 253 and the through hole 221A in the above description are examples, and embodiments are not limited to these examples.

Except for the above features, the membrane electrode assembly 100B of this example may be similar to the membrane electrode assembly 100B of the embodiment or the modification example of the embodiment.

The embodiment, the modification example of the embodiment, and the first example to the fourth example of the embodiment may be combined with each other unless those exclude each other.

Further, from the above description, many modifications and other embodiments of the present disclosure are obvious for a person having ordinary skill in the art. Therefore, the above description should be construed as only examples and is provided for the purpose of teaching a person having ordinary skill in the art the best modes for carrying out the present disclosure. Details of structures and/or functions may substantially be changed without departing from the spirit of the present disclosure.

One aspect of the present disclosure may be used for a membrane electrode assembly that may suppress an increase in contact resistance between an electrolyte membrane (anode catalyst layer) and an anode gas diffusion layer compared to related art.

What is claimed is:

1. A membrane electrode assembly comprising:
an electrolyte membrane that includes a pair of main surfaces;
a cathode catalyst layer that is provided to one main surface of the electrolyte membrane;
an anode catalyst layer that is provided to the other main surface of the electrolyte membrane;
a cathode gas diffusion layer that is provided to the cathode catalyst layer; and
an anode gas diffusion layer that is provided to the anode catalyst layer,
an anode gas diffusion device including:
an anode main body that includes an anode gas diffusion layer that is provided to the anode catalyst layer; and
an anode gas flow path plate, wherein
the anode main body is provided between the anode gas flow path plate and the anode catalyst layer, wherein
the anode gas diffusion layer includes a metal steel plate that includes a main surface and a plurality of vent holes through which gas passes, the main surface of the metal steel plate neighboring the anode catalyst layer,
unevenness is provided to the main surface of the metal steel plate that neighbors the anode catalyst layer, and
a difference in a height of the unevenness in a thickness direction of the metal steel plate is less than a thickness of the electrolyte membrane.

2. The membrane electrode assembly according to claim 1, wherein
a plating layer is provided to the main surface of the metal steel plate that neighbors the anode catalyst layer, and the difference in the height of the unevenness is greater than a membrane thickness of the plating layer.

3. The membrane electrode assembly according to claim 1, wherein
the metal steel plate includes a laminated body of a plurality of metal steel sheets that have a plurality of through holes, and
each of the vent holes is configured by interconnection between the through holes of the neighboring metal steel sheets.

4. The membrane electrode assembly according to claim 3, wherein at least one of the metal steel sheets among the plurality of metal steel sheets includes an interconnection path that interconnects the through holes.

5. The membrane electrode assembly according to claim 4, wherein the interconnection path interconnects the through holes that are provided to a same metal steel sheet which neighbors the metal steel sheet provided with the interconnection path.

6. The membrane electrode assembly according to claim 4, wherein the interconnection path interconnects the through holes that are provided to different metal steel sheets which neighbor the metal steel sheet provided with the interconnection path.

7. The membrane electrode assembly according to claim 1, wherein the anode gas diffusion layer further includes a sintered metal sheet that diffuses gas on a main surface side of the metal steel plate that does not neighbor the anode catalyst layer.

8. An electrochemical hydrogen pump comprising:
a voltage applicator that applies a voltage between the cathode catalyst layer and the anode catalyst layer; and
the membrane electrode assembly according to claim 1.

9. The electrochemical hydrogen pump according to claim 8, wherein
the anode gas diffusion device further includes:
an anode end plate.

10. The electrochemical hydrogen pump according to claim 9, wherein
the anode gas flow path plate is provided between the anode end plate and the anode main body, and
the metal steel plate is provided between the anode main body and the anode catalyst layer.

11. A membrane electrode assembly comprising:
an electrolyte membrane that includes a pair of main surfaces;
a cathode catalyst layer that is provided to one main surface of the electrolyte membrane;
an anode catalyst layer that is provided to the other main surface of the electrolyte membrane;
a cathode gas diffusion layer that is provided to the cathode catalyst layer; and
an anode gas diffusion device including:
an anode main body that includes an anode gas diffusion layer that is provided to the anode catalyst layer; and
an anode gas flow path plate, wherein
the anode main body is provided between the anode gas flow path plate and the anode catalyst layer, wherein
the anode gas diffusion layer includes a metal steel plate that includes a main surface and a plurality of vent holes through which gas passes, the main surface of the metal steel plate neighboring the anode catalyst layer,
unevenness is provided to the main surface of the metal steel plate that neighbors the anode catalyst layer, and
surface roughness Ra of the main surface of the metal steel plate that neighbors the anode catalyst layer is less than a thickness of the electrolyte membrane.

12. The membrane electrode assembly according to claim 9, wherein
  a plating layer is provided to the main surface of the metal steel plate that neighbors the anode catalyst layer, and
  the difference in the height of the unevenness is greater than a membrane thickness of the plating layer.

13. The membrane electrode assembly according to claim 9, wherein
  the metal steel plate includes a laminated body of a plurality of metal steel sheets that have a plurality of through holes, and
  each of the vent holes is configured by interconnection between the through holes of the neighboring metal steel sheets.

14. The membrane electrode assembly according to claim 13, wherein at least one of the metal steel sheets among the plurality of metal steel sheets includes an interconnection path that interconnects the through holes.

15. The membrane electrode assembly according to claim 14, wherein the interconnection path interconnects the through holes that are provided to a same metal steel sheet which neighbors the metal steel sheet provided with the interconnection path.

16. The membrane electrode assembly according to claim 14, wherein the interconnection path interconnects the through holes that are provided to different metal steel sheets which neighbor the metal steel sheet provided with the interconnection path.

17. The membrane electrode assembly according to claim 9, wherein the anode gas diffusion layer further includes a sintered metal sheet that diffuses gas on a main surface side of the metal steel plate that does not neighbor the anode catalyst layer.

18. An electrochemical hydrogen pump comprising:
  a voltage applicator that applies a voltage between the cathode catalyst layer and the anode catalyst layer; and
  the membrane electrode assembly according to claim 11.

19. The electrochemical hydrogen pump according to claim 18, wherein the anode gas diffusion device further includes:
  an anode end plate.

20. The electrochemical hydrogen pump according to claim 19, wherein
  the anode gas flow path plate is provided between the anode end plate and the anode main body, and
  the metal steel plate is provided between the anode main body and the anode catalyst layer.

\* \* \* \* \*